US009456347B2

(12) United States Patent
Hsu et al.

(10) Patent No.: US 9,456,347 B2
(45) Date of Patent: Sep. 27, 2016

(54) CONNECTION METHOD FOR ENHANCING INFORMATION SECURITY

(71) Applicants: Inventec (Pudong) Technology Corp., Shanghai (CN); Inventec Corporation, Taipei (TW)

(72) Inventors: Hsien-Jung Hsu, Taipei (TW); Chien-Yao Huang, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 14/673,856

(22) Filed: Mar. 30, 2015

(65) Prior Publication Data

US 2016/0157096 A1 Jun. 2, 2016

(30) Foreign Application Priority Data

Nov. 28, 2014 (CN) .......................... 2014 1 0707950

(51) Int. Cl.
| | |
|---|---|
| *H04M 1/66* | (2006.01) |
| *H04B 7/00* | (2006.01) |
| *H04W 12/06* | (2009.01) |
| *H04B 5/00* | (2006.01) |
| *H04W 4/00* | (2009.01) |
| *H04W 76/02* | (2009.01) |
| *H04W 12/08* | (2009.01) |
| *H04L 29/06* | (2006.01) |

(52) U.S. Cl.
CPC ........... *H04W 12/06* (2013.01); *H04B 5/0031* (2013.01); *H04W 4/008* (2013.01); *H04W 12/08* (2013.01); *H04W 76/021* (2013.01); *H04L 63/18* (2013.01)

(58) Field of Classification Search
None
See application file for complete search history.

(56) References Cited

U.S. PATENT DOCUMENTS

| | | | | |
|---|---|---|---|---|
| 2009/0327724 | A1* | 12/2009 | Shah ..................... | H04L 9/3271 713/169 |
| 2012/0040639 | A1* | 2/2012 | Brisebois .............. | H04W 48/02 455/408 |
| 2014/0189789 | A1* | 7/2014 | Lewis ..................... | H04L 63/08 726/3 |
| 2015/0371026 | A1* | 12/2015 | Gnanasekaran .... | H04L 63/0853 726/7 |
| 2016/0050699 | A1* | 2/2016 | Boss .................... | H04W 76/023 455/41.2 |

\* cited by examiner

*Primary Examiner* — Erika Washington
(74) *Attorney, Agent, or Firm* — Winston Hsu; Scott Margo

(57) ABSTRACT

A connection method for enhancing information security of an electronic system is disclosed. The electronic system comprises a plurality of communication devices. Each communication device is capable of establishing a plurality of wireless communication connections with another communication device. The plurality of wireless communication connections comprises a near field communication connection. The connection method comprises a first communication device and a second communication device utilizing the near field communication connection to perform a mutual verification process before the first communication device establishes a wireless connection with the second communication device, and the first communication device and the second communication device being allowed to establish a wireless communication connection of the plurality of wireless communication connections after the first communication device and the second communication device pass the mutual verification process.

9 Claims, 4 Drawing Sheets

CONNECTION METHOD FOR ENHANCING INFORMATION SECURITY

BACKGROUND OF THE INVENTION

1. Field of the Invention

The present invention relates to a connection method, and more particularly, to a connection method and a communication device capable of enhancing information security and avoiding occupying large bandwidth.

2. Description of the Prior Art

As electronic communication and network technologies become more popular, internet of things (IoT) is a new trend of technology in the future. All electronic devices with communication modules, such as smart phones, computers, televisions, and even refrigerators, washing machines, air conditionings equipped with communication modules may establish wireless communication connections through wireless network.

In order to ensure information security, when a communication device tries to establish a connection with another communication device, a safety verification process needs to be performed on a server, and after the safety verification process is passed, the data is delivered through the server. The safety verification process includes a first communication device sending a connecting request to the server, the server sending the connecting request to a second communication device, the second communication device sending a granted information to the server after the second communication device grants the connecting request, and the server delivering the granted information to the first communication device, so as to complete the safety verification process. After the safety verification process is completed, the first communication device is allowed to transmit data to the server, and the server delivers the data transmitted from the first communication device to the second communication device.

As can be seen from the above, the safety verification process in the prior art is complicated. In addition to consuming more time to process, when a data amount of the exchanging data is larger or there area large number of communication devices relying on the server to exchange data, a significant bandwidth of the server is occupied. Even worse, if the safety verification process is invaded by hackers, the data may be leaked out, or operations of the server might be affected. Therefore, how to perform the verification process between the communication devices and ensure the information security at the same time is a significant objective in the field

SUMMARY OF THE INVENTION

It is therefore a primary objective of the present invention to provide a connection method capable of quickly completing verification processes between communication devices and avoiding occupying large server bandwidth.

The present invention discloses a connection method utilized for an electronic system. The electronic system comprises a first communication device and a second communication device, the first electronic system is capable of establishing a plurality of wireless communication connections with the second communication device, and the plurality of wireless communication connections comprise a near field communication connection. The connection method comprises before the first communication device establishes a wireless connection with the second communication device, the first communication device utilizing the near field communication connection to perform a first verification process on the second communication device, and the second communication device utilizing the near field communication connection to perform a second verification process on the first communication device; and after the first communication device passes the second verification process and the second communication device passes the first verification process, the first communication device and the second communication device being allowed to establish a wireless communication connection of the plurality of wireless communication connections.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
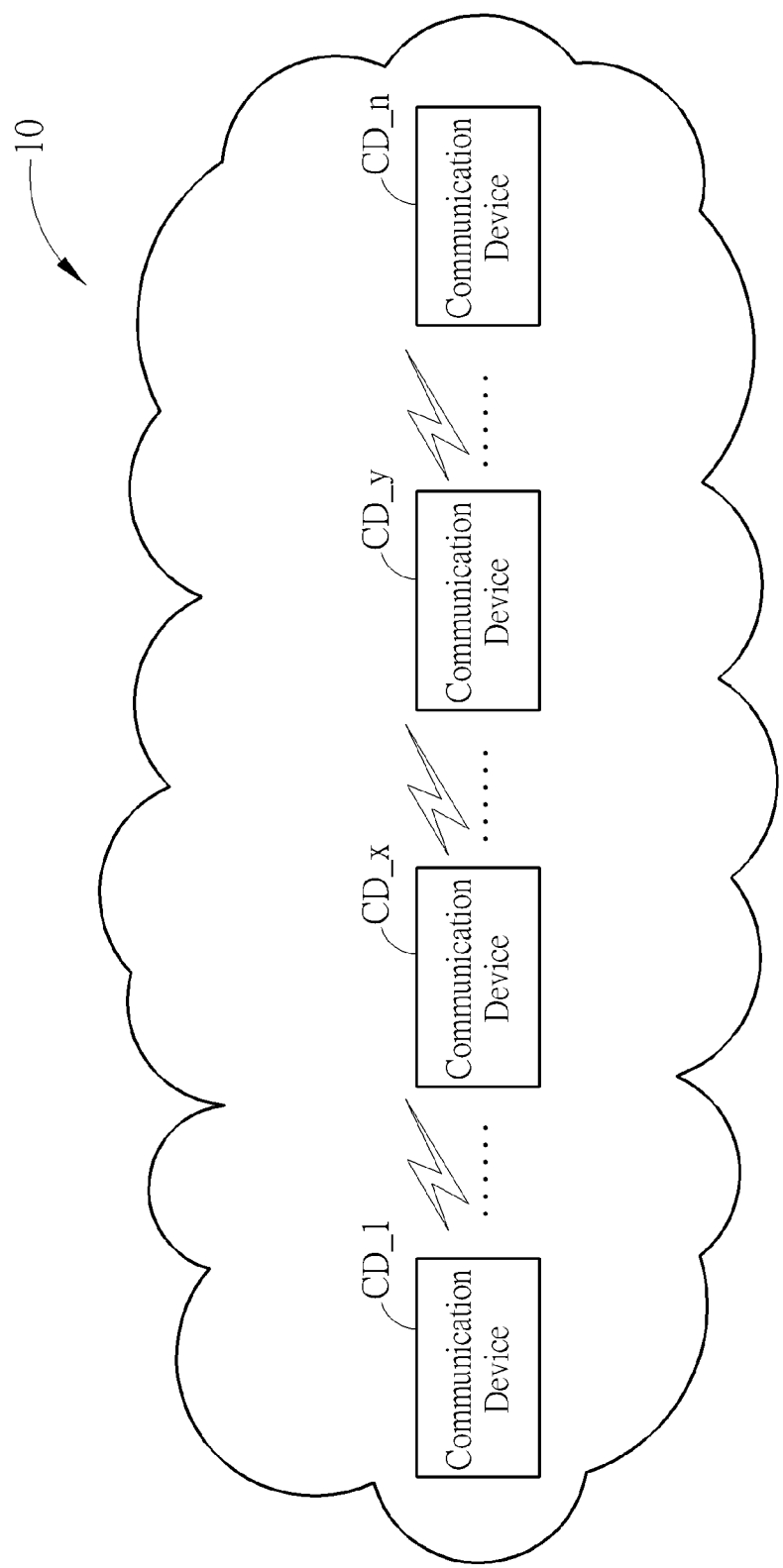
FIG. 1A is a schematic diagram of an electronic system according to an embodiment of the present invention.
Figure 1B:
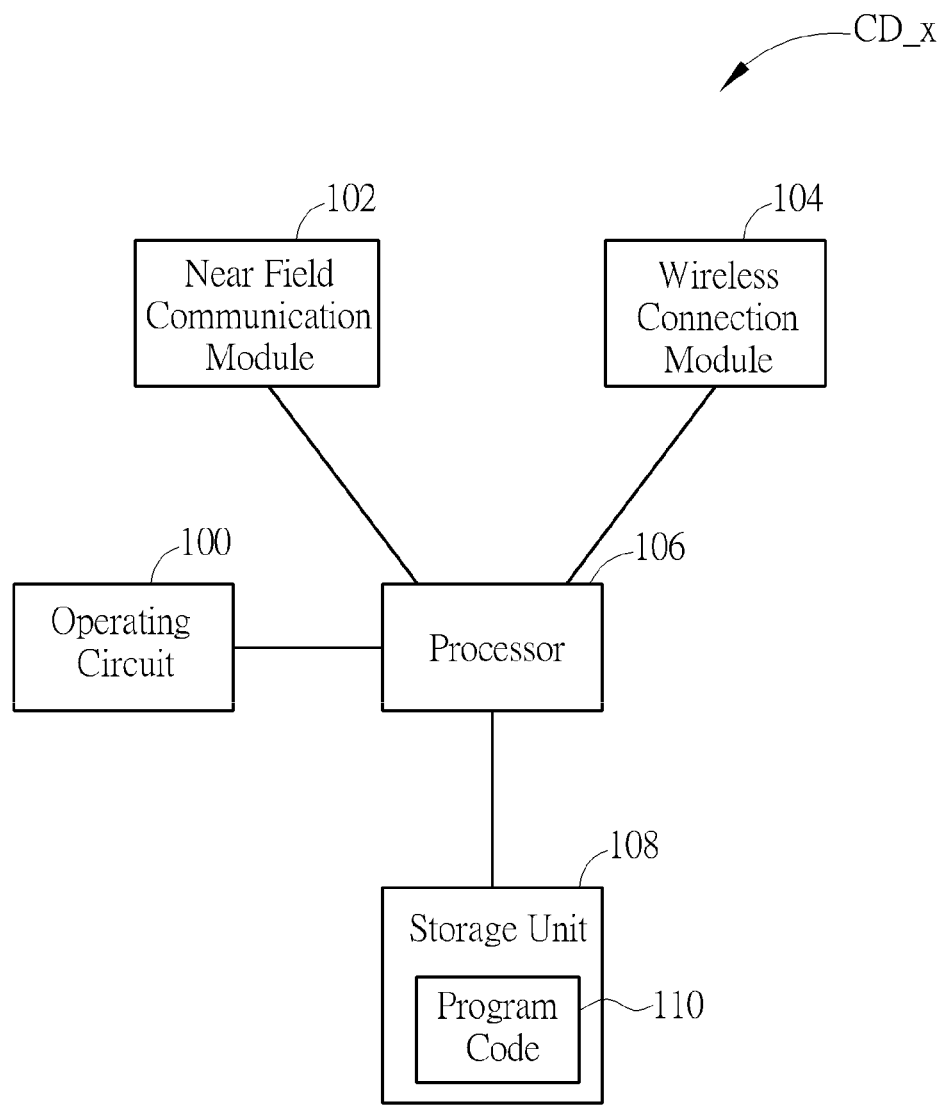
FIG. 1B is a schematic diagram of a communication device of the electronic system in FIG. 1A according to an embodiment of the present invention.

Please refer to FIG. 1A, which is a schematic diagram of an electronic system 10 according to an embodiment of the present invention. The electronic system 10 comprises communication devices CD_1-CD_n. Each of the communication devices CD_1-CD_n may be an electronic product such as a phone, a tablet, a web camera, etc., which is capable of establishing a plurality of wireless communication connections with another communication device. The plurality of wireless communication connections includes a near field communication connection. For clarity, as shown in FIG. 1B, a basic structure of any one of the communication devices CD_1-CD_n, say CD_x, comprises an operating circuit 100, a near field communication module 102, a wireless connection module 104, a processor 106 and a storage unit 108. Moreover, the operating circuit 100 may have different structures according to different applications. For example, the operating circuit 100 of a smart phone may comprise a touch screen, a speaker, a microphone, a rechargeable battery, etc. The near field communication module 102 may establish a near field communication connection with other communication devices, and the wireless connection module 104 may establish wireless communication connections. Common wireless communication connections may be selected from wireless personal area network (WPAN) connections, bluetooth (BT) connections, wireless local network (WLAN) connections, wireless metropolitan area network (WMAN) connections, wireless wide area network (WWAN) connections, wireless fidelity (Wi-Fi) connections, worldwide interoperability for microwave access (WiMAX) connections, long term evolution (LTE) connections, etc., and not limited herein.

Figure 2:
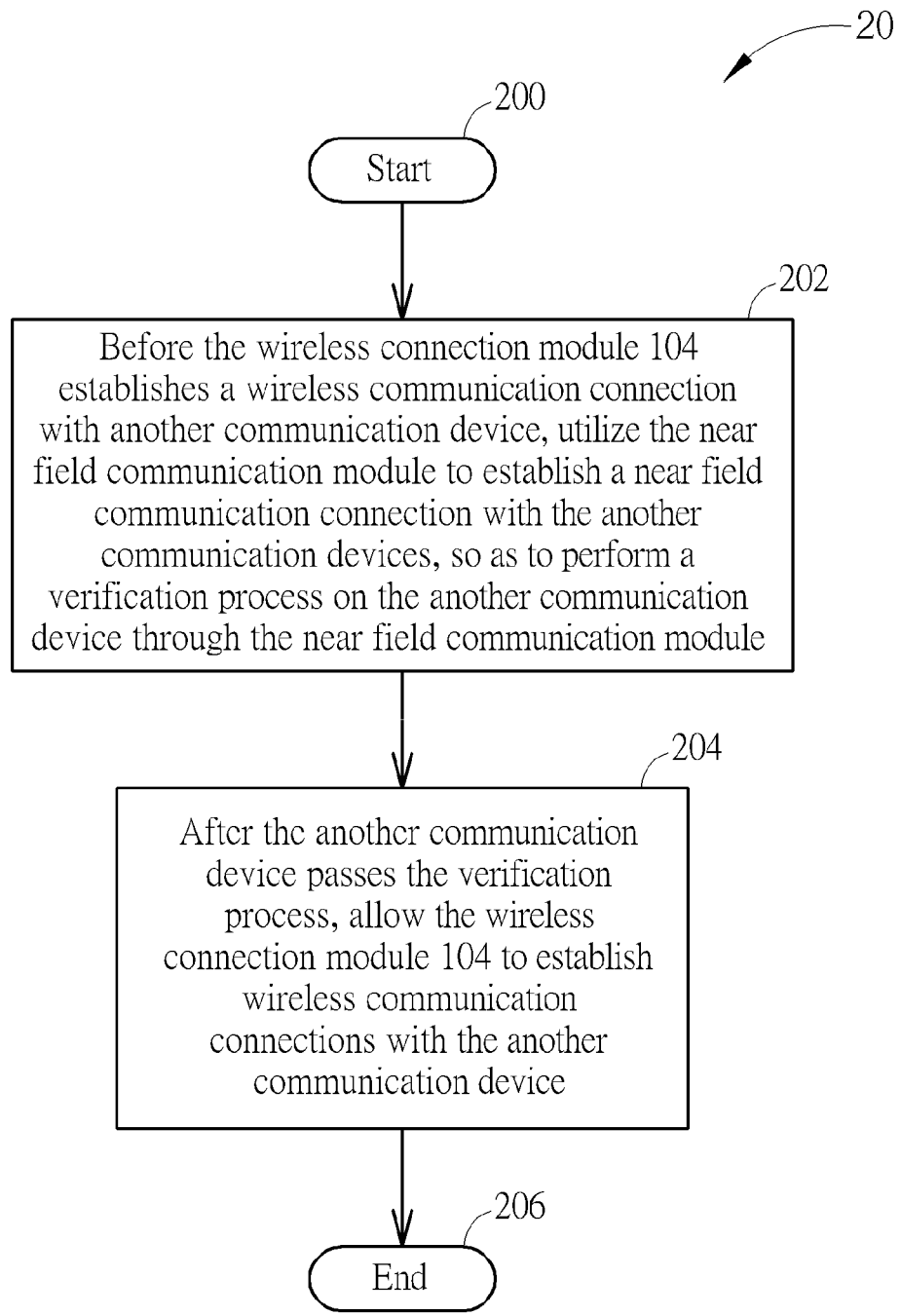
FIG. 2 is a schematic diagram of a connecting process according to an embodiment of the present invention.

In another perspective, for enhancing information security, before the wireless connection module 104 of the communication device CD_x establishes wireless communication connections with another communication device, a verification process should be completed through the near field communication module 102. Related operations thereof may be referred to FIG. 2, which is a schematic diagram of a connecting process 20 according to an embodiment of the present invention. The connecting process 20 may be applied to each of the communication devices CD_1-CD_n, and compiled as a program code 110 stored in the storage unit 108. The program code 110 may instruct the processor 106 to execute the connecting process 20. The connecting process 20 comprises following steps:

Step 200: Start.

Step 202: Before the wireless connection module 104 establishes a wireless communication connection with another communication device, utilize the near field communication module to establish a near field communication connection with the another communication devices, so as to perform a verification process on the another communication device through the near field communication module.

Step 204: After the another communication device passes the verification process, allow the wireless connection module 104 to establish wireless communication connections with the another communication device.

Step 206: End.

According to the connecting process 20, before an communication device of the communication devices CD_1-CD_n (e.g., the communication device CD_x) establishes a wireless communication connection with another communication device (e.g., the communication device CD_y), the communication device CD_x should perform a verification process on the communication device CD_y through the near field communication connection. After the communication device CD_y passes the verification process, establishment of the wireless communication connection is allowed to proceed. Since a basic requirement of the near field communication connection is that a distance between the communication device CD_x and the communication device CD_y should be within tens of centimeters, if the distance is out of range, the near field communication connection may not be properly built, such that the communication device CD_y may fail to pass the verification process of the communication device CD_x. Thus, a limitation on distance may make sure that a user of the communication device CD_x has confidence in a user of the communication device CD_y, or the communication device CD_x and the communication device CD_y are used by a same user. In such a situation, the communication device CD_x and the communication device CD_y are allowed to proceed to establish other types of wireless communication connections after passing the near field verification process, and thus, invasion by unknown people is avoided, so as to enhance the information security. Meanwhile, the near field verification process does not have to be performed through a server, such that a waiting time of the user is spared.

Furthermore, according to the connecting process 20, a communication device of the communication devices CD_1-CD_n is allowed to perform the wireless communication connections with another communication device after the another communication device passes the verification process. In other words, each of the communication devices has to perform mutual verification processes with another communication device, and the wireless connection is built after the verification processes of each other are passed. For example, if the communication device CD_y passes the verification process of the communication device CD_x, but the communication device CD_x fails to pass the verification process of the communication device CD_y, then the communication device CD_x is allowed to proceed establishment of the wireless connection with the communication device CD_y, but the communication device CD_y would not to proceed the establishment of the wireless connection with the communication device CD_x. That is, the wireless connection module 104 of the communication device CD_y is not allowed to establish a wireless connection with the communication device CD_x.

Notably, the connecting process 20 is an embodiment of the present invention. Those skilled in the art may make modifications and alternations accordingly, and not limited herein. For example, the processor 106 may be a microprocessor or an application-specific integrated circuit (ASIC). The storage unit 108 may be read-only memory (ROM), random-access memory (RAM), non-volatile memory (e.g., an electrically erasable programmable read only memory (EEPROM) or a flash memory), CD-ROMs, magnetic tapes, floppy disks, optical data storage devices, etc. In addition, the near field communication module 102 may operate in a card emulation mode, a point-to-point (P2P) mode, a reader/writer mode, etc. For example, the communication device CD_x may utilize the card emulation mode to access a smart card (IC card) disposed on the communication device CD_y. Under a circumstance that the communication device CD_y is powered off, the communication device CD_x may still perform the verification process with the communication device CD_y. Alternatively, the communication device CD_x and the communication device CD_y may perform the verification process directly with each other using the P2P mode by exchanging verification data. Furthermore, in an embodiment, the communication device CD_x may read and scan a quick response code (QR code) displayed by the communication device CD_y, and perform the verification process with the communication device CD_y. Methods of the communication device CD_x utilizing the near field communication module 102 to perform the verification process on the communication device CD_y are not limited herein, and those skilled in the art may make modifications and alternations accordingly. In addition, the verification process may be modified according to a setting of a user. For example, the communication devices CD_1-CD_n may further build up rejection lists or trust lists, such that the user may edit the trust lists containing the communication devices which the users like to connect to and the rejection lists containing the communication devices which the users refuse to connect to. For example, if the user of the communication device CD_x sets in advance that the communication device CD_y is in a rejection list of the communication device CD_x, there is no way for the communication device CD_y to pass the verification process of the communication device CD_x. Similarly, if the user of the communication device CD_x sets in advance that the communication device CD_y is in a trust list of the communication device CD_x, when the distance between the communication device CD_y and the communication device CD_x satisfies the establishing condition of the near field communication connection, the communication device CD_y would pass the verification process of the communication device CD_x, and the communication device CD_x may proceed the establishment of the wireless communication connection with the communication device CD_y.

Furthermore, if the electronic system 10 comprises a server, one of the communication devices CD_1-CD_n may send mutual verification information of another communication device passing the verification process, such as connection status, address information, etc., to the server. The mutual verification information may be continuously or periodically updated. For example, when the communication device CD_x and the communication device CD_y pass the verification processes of each other, the communication device CD_x and the communication device CD_y may continuously or periodically update the connection statuses and the address information of the two communication devices on the server, for managing conveniently.

In addition, in FIG. 1B, the communication device CD_x represents a basic structure of one of the communication devices CD_1-CD_n, but not limited herein. For example, in an embodiment, the communication devices CD_1-CD_n may comprise a plurality of wireless connection modules. In such a situation, after two of the communication devices pass the verification processes of each other, a most appropriate wireless communication connection of the plurality of wireless communication connections may be selected to perform wireless connection according to the mutual verification information on the server. For example, when the communication device CD_x and the communication device CD_y are in a same network domain, the communication device CD_x may search the communication device CD_y among the same network domain and try to build up a connection with the communication device CD_y via broadcasting over the same network domain. When the communication device CD_x and the communication device CD_y are not in a same network domain, the communication device CD_x may link to the server and access the mutual verification information, acquire the current internet address of the communication device CD_y according to the address information of the mutual verification information, and select a most appropriate wireless communication connection with the communication device CD_y. In other words, the server may provide the mutual verification information of the communication device CD_x and the communication device CD_y only when the communication device CD_x and the communication device CD_y are not in a same network domain, to assist the communication device CD_x and the communication device CD_y to perform the verification processes and the connection establishment. In this case, performing the verification processes and the connection establishment does not have to rely on the server.

In detail, after the communication device CD_x and the communication device CD_y perform the near field verification processes and have confidence in each other so as to be allowed to establish a connection in between, if one or two of the communication device CD_x and the communication device CD_y are moved by the user (s) to different locations, when there is a requirement for connecting the communication device CD_x and the communication device CD_y later on, a long range communication connection may be established according to the mutual verification information. For example, if the communication device CD_x is a smart phone, and the communication device CD_y is a web camera deployed in a home residence, the smart phone may perform the verification process with the web camera in advance. Therefore, when a user carries the smart phone out of the home residence, the user may have visual contents captured by the web camera in the home residence since the verification process between the smart phone and the web camera is performed in advance. In addition, since the web camera only builds up the connection with the granted smart phone which passes the verification process, the visual contents are only sent to the smart phone which passes the verification process. Since transmission of the captured visual contents does not have to be delivered through the server, invasion by unknown people is avoided, so as to enhance the information security and avoid occupying too much bandwidth of the server. The near field verification process does not have to be performed through the server, such that a waiting time of the user is spared as well.

Figure 3:
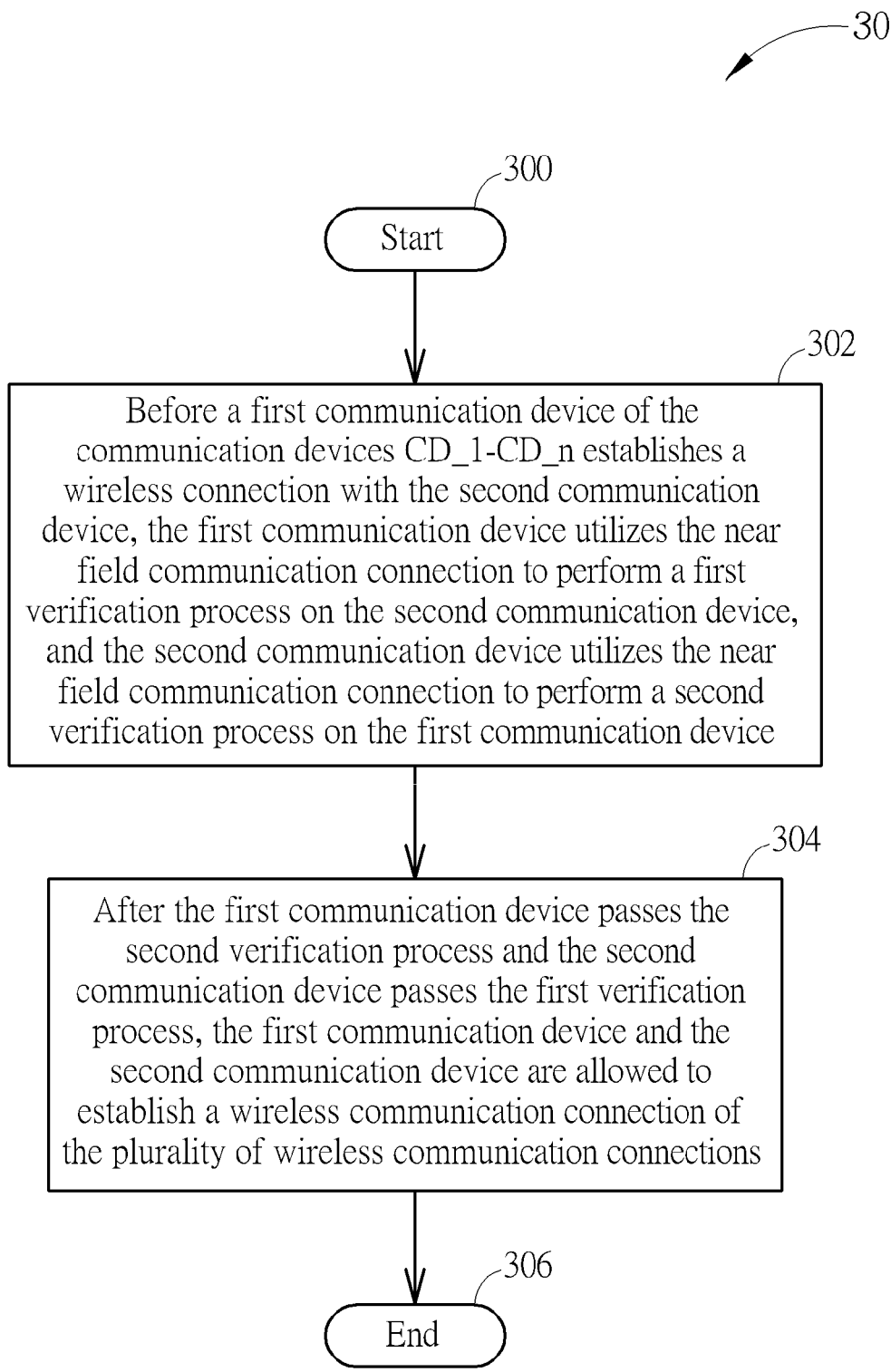
FIG. 3 is a schematic diagram of a connecting process according to an embodiment of the present invention.

The operations of the electronic system 10 may be further summarized into a connecting process 30, as shown in FIG. 3. The connecting process 30 comprises following steps:

Step 300: Start.

Step 302: Before a first communication device of the communication devices CD_1-CD_n establishes a wireless connection with the second communication device, the first communication device utilizes the near field communication connection to perform a first verification process on the second communication device, and the second communication device utilizes the near field communication connection to perform a second verification process on the first communication device.

Step 304: After the first communication device passes the second verification process and the second communication device passes the first verification process, the first communication device and the second communication device are allowed to establish a wireless communication connection of the plurality of wireless communication connections.

Step 306: End.

The details of each step of the connecting process 30 can be referred to the relative paragraphs of the embodiments stated above, and are not narrated herein for brevity. Thereby, the first communication device and the second communication device perform the mutual verification processes using the near field communication connection, and after the verification processes are passed, the first communication device and the second communication device are allowed to establish wireless communication connections, so as to exchange data. In comparison to the prior art, the verification processes do not have to be performed through the server, so as to sparse the waiting time of the user. After the wireless communication connections are built, data transmission between the first communication device and the second communication device is not performed through the server, such that the occupation of the server bandwidth is significantly reduced and data is prevented from leaking out due to the invasion of the server by hackers.

In summary, the secure connection establishing process of the present invention allows the communication devices to perform the verification process directly, so as to spare the waiting time of the user and avoid occupying too much bandwidth of the server.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connection method utilized for an electronic system, the electronic system comprising a first communication device, a second communication device and a server, the first electronic system being capable of establishing a plurality of wireless communication connections with the second communication device, the plurality of wireless communication connections comprising a near field communication connection, the connection method comprising:

before the first communication device establishes a wireless connection with the second communication device, the first communication device utilizing the near field communication connection to perform a first verification process on the second communication device, and the second communication device utilizing the near field communication connection to perform a second verification process on the first communication device;

after the first communication device passes the second verification process and the second communication device passes the first verification process, the first communication device and the second communication device being allowed to establish a wireless communication connection of the plurality of wireless communication connections; and after the first communication device and the second communication device respectively pass the second verification process and the first verification process, the second communication device and the first communication device sending a mutual verification information, with information of the first communication device and the second communication device passing the second verification process and the first verification process, to the server.

2. The connection method of claim 1, wherein when the first communication device fails to pass the second verification process or the second communication device fails to pass the first verification process, the first communication device and the second communication device are not allowed to establish a wireless communication connection of the plurality of wireless communication connections.

3. The connection method of claim 1, wherein when a distance between the first communication device and the second communication device is greater than a distance required for establishing the near field communication connection, the first communication device and the second communication device fail to pass the second verification process and the first verification process.

4. The connection method of claim 1, wherein when the second communication device is in a first rejection list of the first communication device, the second communication device fails to pass the first verification process, and when the first communication device is in a second rejection list of the second communication device, the first communication device fails to pass the second verification process.

5. The connection method of claim 1, further comprising after the first communication device and the second communication device respectively pass the second verification process and the first verification process, the first communication device recording the second communication device in a first trust list, and the second communication device recording the first communication device in a second trust list.

6. The connection method of claim 5, further comprising after the first communication device and the second communication device respectively pass the second verification process and the first verification process, the first communication device and the second communication device starting to establish a wireless communication connection of the plurality of wireless communication connections.

7. The connection method of claim 1, wherein the mutual verification information comprises a connection status and an address information of the first communication device and the second communication device.

8. The connection method of claim 7, further comprising the first communication device and the second communication device periodically updating the address information.

9. The connection method of claim 1, further comprising after the first communication device and the second communication device respectively pass the second verification process and the first verification process, the first communication device and the second communication device determining to use a most appropriate wireless communication connection of the plurality of wireless communication connections to connect according to the mutual verification information.

* * * * *